US005546837A

United States Patent [19]

Dibble et al.

[11] Patent Number: 5,546,837

[45] Date of Patent: Aug. 20, 1996

[54] RING SUPPORT ASSEMBLY

[75] Inventors: Gary E. Dibble, Wellsville; Wallace F. Morehouse, Olean; Ralph G. Blackman, Wellsville, all of N.Y.

[73] Assignee: Dresser-Rand, Wellsville, N.Y.

[21] Appl. No.: 213,566

[22] Filed: Mar. 16, 1994

[51] Int. Cl.[6] .............................. B23B 31/40; B23Q 3/14

[52] U.S. Cl. .............................. 82/169; 82/101; 279/2.01

[58] Field of Search .............................. 82/85, 97, 101, 82/168, 169; 269/48.3, 52; 279/2.01, 2.19, 2.22, 110, 112, 113

[56] References Cited

U.S. PATENT DOCUMENTS

| | | | |
|---|---|---|---|
| 2,179,896 | 11/1939 | Neville . | |
| 2,572,013 | 10/1951 | Cushman | 269/50 |
| 2,696,765 | 12/1954 | Appleton | 269/50 |
| 2,775,025 | 12/1956 | Williams | 279/2.01 |
| 2,780,194 | 2/1957 | Croswell | 269/52 |
| 2,804,836 | 9/1957 | Tiedemann | 269/52 |
| 3,110,277 | 11/1963 | Dixon et al. | 269/52 |
| 3,298,700 | 1/1967 | Vogeleer | 269/52 |
| 3,469,299 | 9/1969 | Rogers | 269/52 |
| 3,633,813 | 1/1972 | Looney et al. | 228/44 |
| 4,926,538 | 5/1990 | Bond et al. | 29/559 |

FOREIGN PATENT DOCUMENTS

| | | | |
|---|---|---|---|
| 406000707 | 1/1994 | Japan | 279/2.01 |

*Primary Examiner*—M. Rachuba
*Assistant Examiner*—Kenneth J. Hansen
*Attorney, Agent, or Firm*—Nixon, Hargrave, Devans & Doyle

[57] ABSTRACT

An apparatus for supporting a ring piece being cut from a ring-shaped structure is disclosed. The ring support member or assembly includes a bar assembly having a convex arcuate surface adapted to be disposed against and aligned with an inner circumferential portion of the ring-shaped structure. In addition to the convex arcuate surface, the bar assembly has a pair of substantially parallel faces which are substantially perpendicular to the convex arcuate surface. A supporting stud extends substantially perpendicularly through the faces of the bar assembly. A first clamping assembly is attached to one end of the supporting stud to fix the bar assembly to the supporting stud. A second clamping assembly is attached to the other end of the supporting stud and is adapted to fix the bar assembly and the supporting stud to an object, such as a plate with elongated radially disposed slots.

13 Claims, 5 Drawing Sheets

RING SUPPORT ASSEMBLY

FIELD OF THE INVENTION

This invention relates to a support assembly, particularly suitable for supporting a ring piece being cut from a ring-shaped structure.

BACKGROUND OF THE INVENTION

The task of cutting a ring piece is difficult, time consuming, and sometimes hazardous. Most of these problems stem from the failure to provide adequate support for the ring piece as it is being cut from a ring-shaped structure. Traditional techniques for cutting ring pieces only involve the use of conventional clamps to secure the ring-shaped structure being cut.

The use of conventional clamps has presented a number of problems. Often the ring-shaped structures, from which ring pieces are cut, have thin walls which are easily distorted. Conventional clamps are frequently connected to the ring shaped structures with too much force, distorting the ring-shaped structure and thus damaging any ring pieces cut from the structure. Additionally, conventional clamps do not provide the necessary support for the piece as it is being cut.

Failing to support the ring piece results in a number of problems. As the ring-shaped structure is being cut, the weight of the cut ring piece bears down on the cutting blade. As a result, the path of the blade through the ring-shaped structure may be altered resulting in an uneven cut. Additionally, the weight on the blade from the ring piece slows down the rate at which the cut can be made, thus reducing productivity. Further, when the cut is almost completed, the unsupported ring piece often breaks off and leaves an undesirable burr. Occasionally, the ring piece may break loose, fly off the surface from which the ring piece is being cut, and injure the operator or others nearby. Accordingly, there is a need for an improved cutting system for cutting ring pieces from ring-shaped structures.

SUMMARY OF THE INVENTION

The present invention is directed to an apparatus and method for supporting a ring piece being cut from a ring-shaped structure. The ring support assembly includes a bar assembly having a convex arcuate surface adapted to be disposed against and aligned with an inner circumferential portion of the ring-shaped structure. The bar assembly has a pair of substantially parallel faces which are substantially perpendicular to the convex arcuate surface. A supporting stud extends substantially perpendicularly through the faces of the bar assembly. A first clamping assembly is attached to one end of the supporting stud to fix the bar assembly to the supporting stud. A second clamping assembly is attached to the other end of the supporting stud and is adapted to fix the bar assembly and the supporting stud to an object, such as a plate with elongated radially disposed slots. The ring support member can have one or more bar assemblies, each with a supporting stud.

A method of cutting a ring piece from a ring-shaped structure includes several steps. First, the ring-shaped structure is secured to a surface. Next, a first cut is made along the inner circumference of the ring-shaped structure. The first cut extends partially through the ring-shaped structure. Next, at least two bar assemblies, each with a convex arcuate surface, are disposed against a portion of the inner circumference of the ring-shaped structure and above the first cut.

When the bar assemblies are in position, each bar assemblies is secured to a surface. Next, a second cut, aligned with the first cut, is made along the outer circumference of the ring-shaped structure and through the ring-shaped structure to form the ring piece. An intermediate cut, aligned with the first cut, may be made along the outer circumference, but not through the ring-shaped structure and before the bar assemblies are disposed against the inner circumference.

The ring support assembly provides several advantages over the use of traditional clamping structures. With the ring support member, the cutting blade will not bind within the cut. Since the blade will not bind, ring-shaped structures can be cut more quickly increasing the output of ring pieces which can be produced. Additionally, preventing the blade from binding results in a cleaner and more even cut. The ring support member is also easier to install and is safer to use because the ring piece is less likely to break loose and fly off.

DETAILED DESCRIPTION OF THE INVENTION

Figure 1:
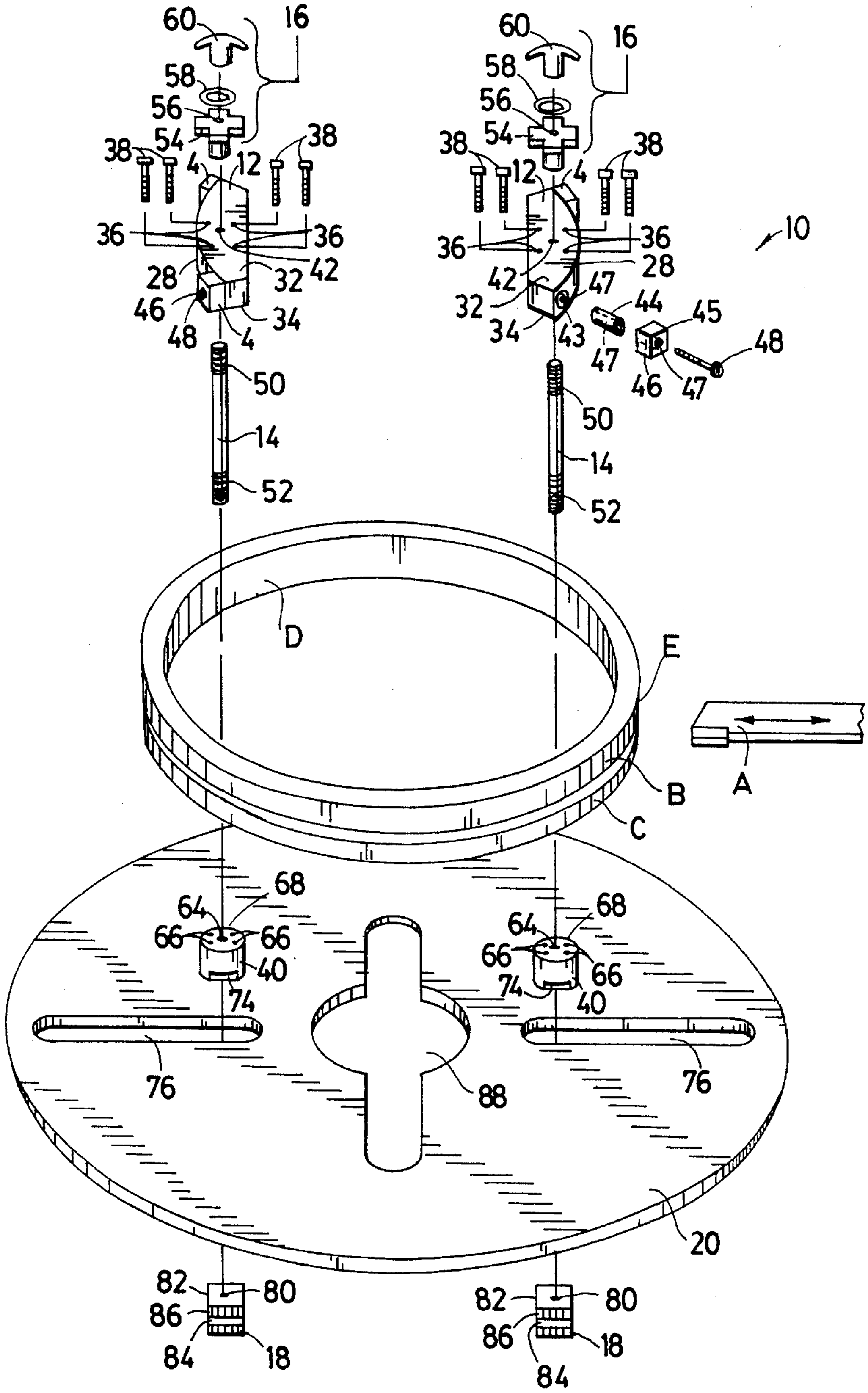
FIG. 1 is an exploded perspective view of a ring support assembly in accordance with one embodiment of the present invention with a ring-shaped structure and a cutting tool.

A ring support member or assembly 10 in accordance with one embodiment of the present invention is illustrated in FIGS. 1–4. The ring support member 10 includes at least one bar assembly 12, a supporting stud 14, first and second clamping assemblies 16 and 18 and a plate 20. With the ring support assembly 10, a cutting tool A use to cut a ring piece B from a ring-shaped structure C does not bind within the cut so that productivity can be increased and higher ring piece qualities can be obtained. The ring support member 10 is easy to install, is safe to use, and is less likely to distort thin walled ring-shaped structures C than conventional clamps, thus preserving the desired shape of the cut ring pieces B.

Referring to FIG. 1, the ring support member 10 in accordance with one embodiment of the invention is shown in an exploded view with the ring-shaped structure C to be cut by the cutting tool A. The bar assembly 12 has convex arcuate surface 28 which is adapted to be disposed against and aligned with the inner circumference D of the ring piece B. Each bar assembly 12 also has a pair of substantially parallel faces 32 and 34 which are substantially perpendicular to the convex arcuate surface 28. Four threaded holes 36 pass through the faces 32 and 34 of each bar assembly 12 and are adapted to receive four threaded bolts 38. The bolts 38 passing through the threaded holes 36 are used to secure each bar assembly 12 to a base 40. Although four threaded holes 36 with four threaded bolts 38 are shown, any device which would secure each bar assembly 12 to one base 40 could be used, such as glue or different numbers of bolts and holes. Each bar assembly 12 also has a center hole 42 which also passes through the faces 32 and 34 and is substantially perpendicular to the convex arcuate surface 28. The center hole 42 is adapted to receive one end 50 of the supporting stud 14.

In this particular embodiment, each bar assembly 12 is preferably made from aluminum or from any other type of lightweight materials and is 12.12" long, and 2.295" wide, and 1.5" high. The convex arcuate surface 28 in this embodiment has a curvature of about 40 degrees. It would be appreciated by one skilled in the art that the particular size and shape of each bar assembly 12 and the particular curvature of the arcuate convex surface 28 will depend upon and can be adjusted to match the size, shape, and curvature of the ring-shaped structure C to be cut. Although in this particular embodiment, there are two bar assemblies 12 each with a supporting stud 14, base 40, and first and second clamping devices 16 and 18, the ring support member 10 could include more than two bar assemblies 12 each with a supporting stud 14, base 40, and first and second clamping devices 16 and 18 as needed and desired.

Each bar assembly 12 also has a pair of stops 44 which are attached at distal ends of the convex arcuate surface 28. The stops 44 protect the ring-shaped structure C from damage by the ring support member 10 and provide sufficient resistance or friction to support the ring piece B being cut. Each stop 44 fits within a circular indent 43 in the convex arcuate surface 28 and has a hole 47 which passes through to and into the convex arcuate surface 28. In this particular embodiment, an optional block 45 with a bore 46 which fits over the stop 44 is included. The hole 47 also passes through block 45 and screw 48 passes through block 45 and stop 44 to secure each stop 44 and each block 45 to the convex arcuate surface 28. Although a screw 48 is shown other devices for securing the stops 44 and blocks 45 could be used, such as glue. In this particular embodiment, the stops 44 are made from nylon, have a cylindrical shape, and are ¾" long with a diameter of ½" to ¾". It would be appreciated by one skilled in the art that the stops 44 could be made from other materials, such as rubber, could have other shapes, such as square, and could have other dimensions. Additionally, the two stops 44 could be replaced by a single protective pad which would run along the length of the convex arcuate surface 28, by a set of more than two stops 44, or by a block 45, as shown, which is seated over or replaces each stop 44 and engages with the ring piece B being cut.

Each bar assembly 12 is supported by one of the supporting studs 14. In this particular embodiment, each supporting stud 14 has a rod-like shape and is threaded at each end 50 and 52. One end 50 of each supporting stud 14 is adapted to pass through the center hole 42 in one bar assembly 12. The first clamping assembly 16 includes a hand knob 54, a hex jam nut 58, and a T-handle 60. The hand knob 54, shown more clearly in FIG. 2 which illustrates a side view of the bar assembly of the ring support assembly of FIG. 1, has a threaded opening 56 which is adapted to fit over one of the threaded ends 50 of each supporting stud 14. The hex jam nut 58 fits over the same end 50 of the supporting stud 14 and is seated on the hand knob 54. The T-handle 60 with a threaded hole 62 is screwed on to the same threaded end 50 of the supporting stud 14 extending from the hand knob 54 and hex jam nut. In this particular embodiment, each supporting stud 14 is 7" long and has a diameter of ½". It would be appreciated by one skilled in the art that each supporting stud 14 could be constructed to be height adjustable, could have other dimensions and shapes depending on the size of the ring-shaped structure C and the size of the ring piece B to be cut, and could have an other first clamping assembly 16, besides the hand knob 54, the hex jam nut 58, and the T-handle 60, which would secure the bar assembly 12 to the supporting stud 14.

Figure 2:
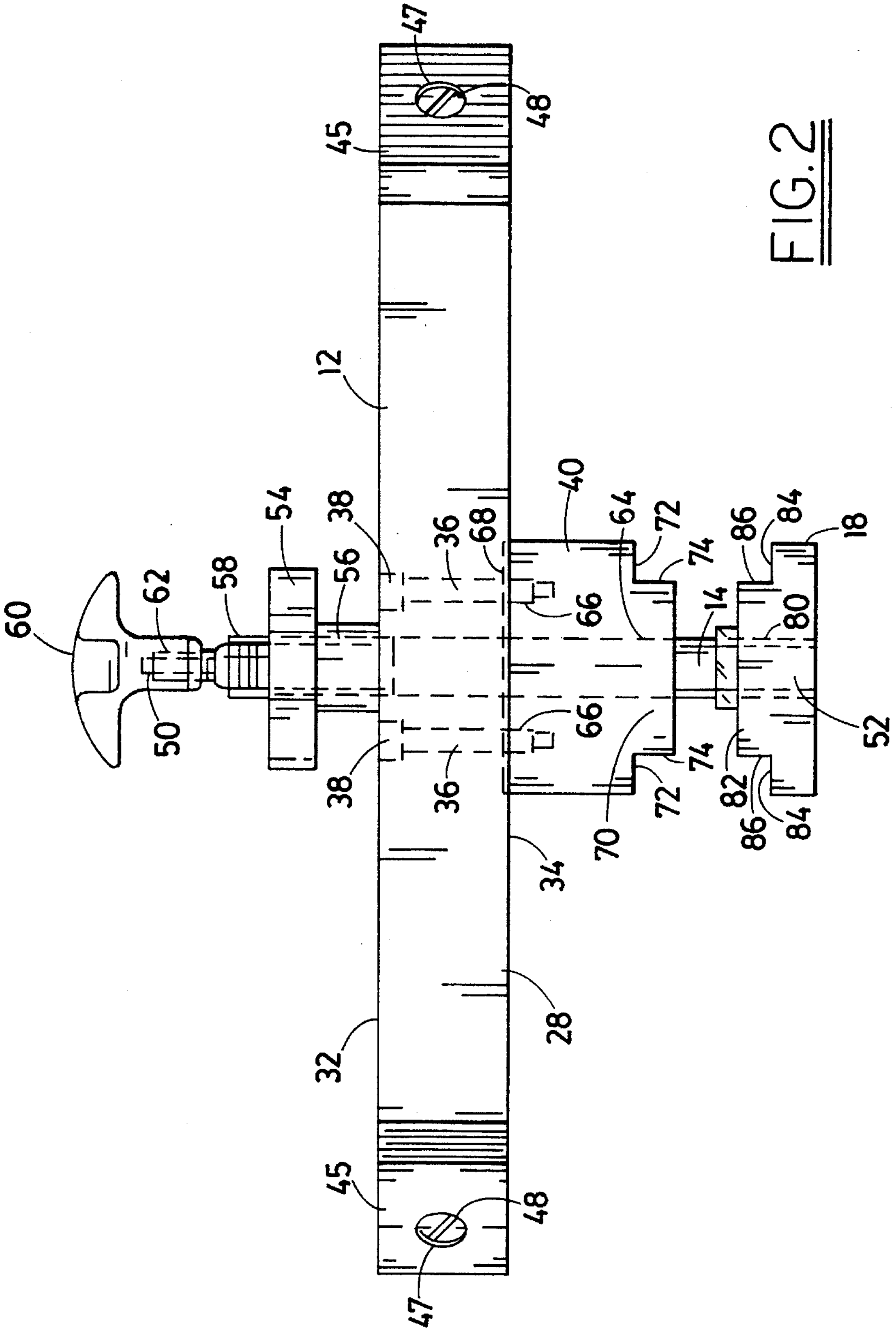
FIG. 2 is a side view of the bar assembly of the ring support assembly of FIG. 1.

Each base 40 is used to support one bar assembly 12 and one supporting stud 14 in a substantially upright vertical direction, as shown more clearly in FIG. 2. Each base 40 has a substantially cylindrical shape and has a hole 64 passing through its center which is adapted to allow the other end 52 of the supporting stud 14 to pass through. In addition, each base 40 has four other holes 66 to receive the ends of the bolts 38 used to secure each bar assembly 12 to the base 40. When the bolts 38 are passed through each bar assembly 12 they pass into the four holes 66 in each base 40 joining the bar assembly 12 and base 40 together, such that one side 68 of each base 40 engages with one face 34 of the bar assembly 12, as shown in FIG. 2. The opposite side of the base 40 has a stepped portion 70, with two corner faces 72 and 74 on each side of the stepped portion 70, also as shown in FIG. 2. The stepped portion 70 fits within a radially disposed slot 76 in the plate 20, with one corner face 72 resting against a surface of the plate 20 and the other corner face 74 resting against the side of the elongated radial slot 76. In this particular embodiment, each base 40 is 2.74" wide and 2.00" high and the stepped portion 70 is 0.5" high, 1¾" wide and has a ½" diameter, although it would be appreciated by one skilled in the art that the dimensions and shape of each base 40 can vary as needed for each particular application.

The second clamping device 18 is used to secure the other threaded end 52 of one supporting stud 14 to an object, such as the plate 20. Each second clamping assembly 18 has a threaded hole 80 adapted to receive the other threaded end 52 of one of the supporting studs 14. Each second clamping assembly 18 also has a stepped portion 82 with two corner faces 84 and 86 on each side of the stepped portion 82. The stepped portion 82 for each second clamping assembly 18 is adapted to fit within one of the radially disposed slots 76 from the opposite side of the plate 20 from the base 40 and engage with the stepped portion 70 of the base 40. One corner face 84 rests against the bottom of the plate 20 and the other face 86 rests against the side of one of the radially disposed slots 76. In this particular embodiment, each second clamping assembly 18 is 2.75" wide and 0.88" high and the step is 0.38 high and 0.44" deep from the side, although it would be appreciated by one skilled in the art that each second clamping assembly 18 could have other dimensions and shapes as needed.

The plate 20 has a circular shape and has two radially disposed, elongated slots 76 which are positioned about 180 degrees apart. The plate 20 also has a center hole 88 which is used to clean chips and coolant. As discussed above, one base 40 and one second clamping assembly 18 engage with one slot 76 to support one bar assembly 12 and one supporting stud 14 in a substantially upright position. The base 40 and second clamping assembly 18 can slide along the length of the slot 76 until the desired position for the bar assembly 12 is obtained. In this particular embodiment, the plate 20 has a radius of 21" and each slot is 2" wide and 14" long although it would be appreciated by one skilled in the art that the plate 20 could have shapes, the slots 76 could have other dimensions and shapes, and the plate 20 could have more than two slots 76, if desired and needed to support more than two bar assemblies 12 with supporting studs 14.

Figure 3:
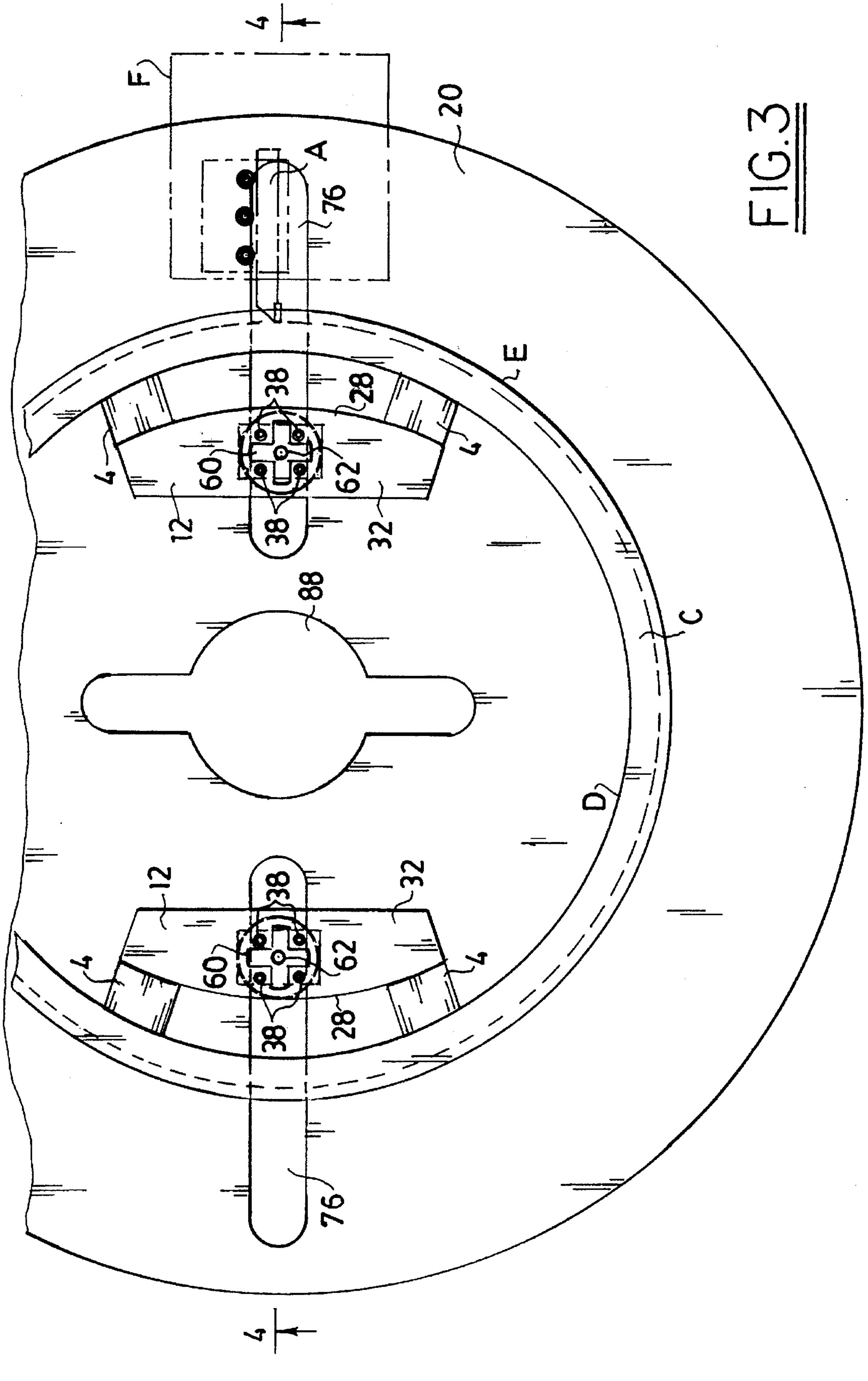
FIG. 3 is a top view of the ring support assembly of FIG. 1.
Figure 4:
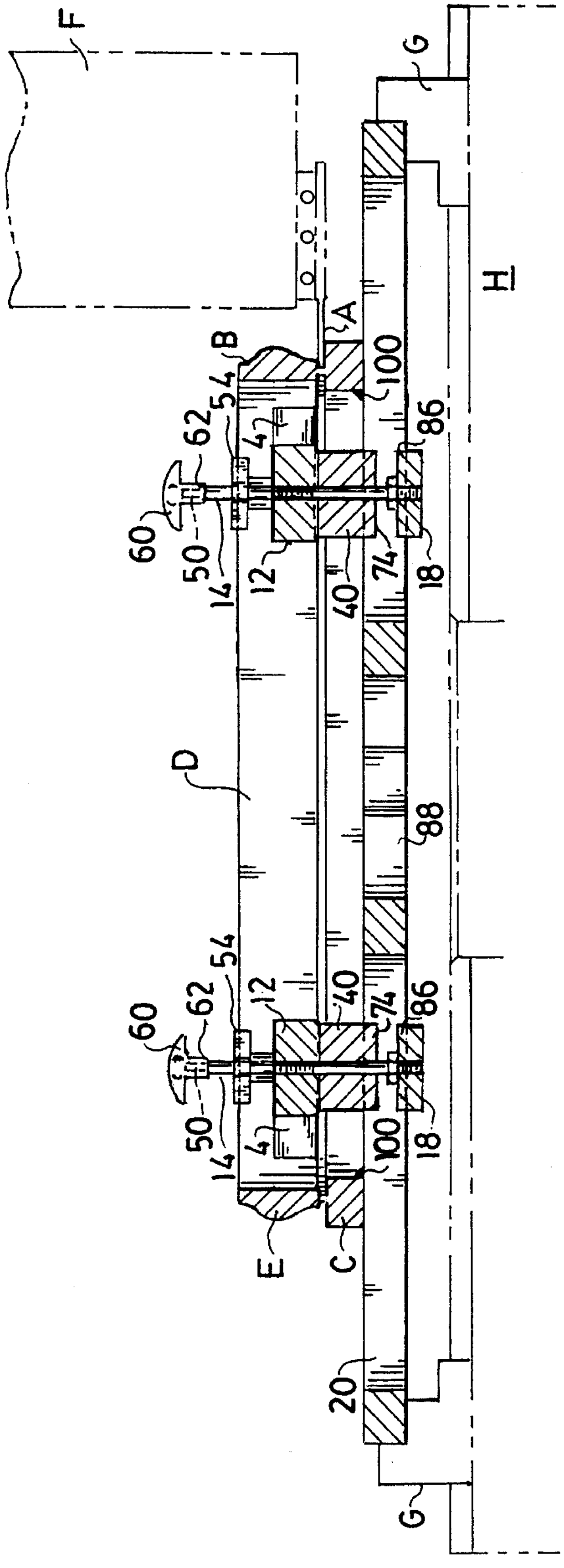
FIG. 4 is a cross-sectional side view of the ring support assembly taken along line 4—4 of FIG. 3.
Figure 5A:
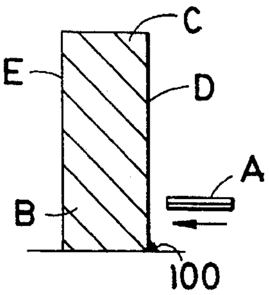
FIGS. 5(*a–j*) are side cross-sectional views of the steps involved in a method for cutting a ring-shaped structure using the ring support assembly in accordance with the present invention.
Figure 5B:
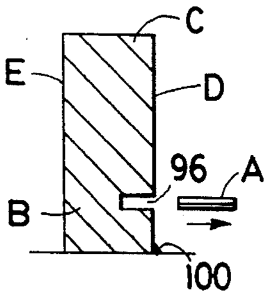
Figure 5C:
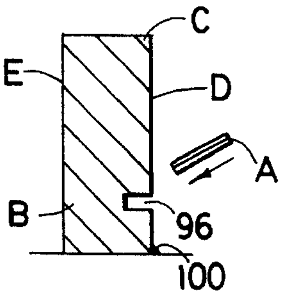
Figure 5D:
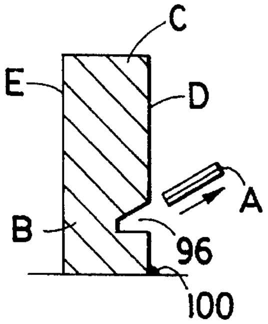
Figure 5E:
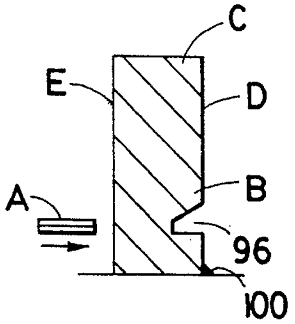
Figure 5F:
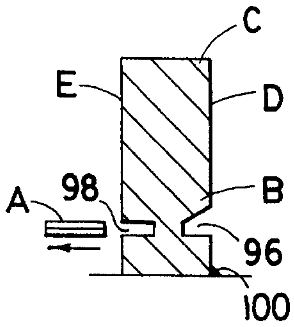
Figure 5G:
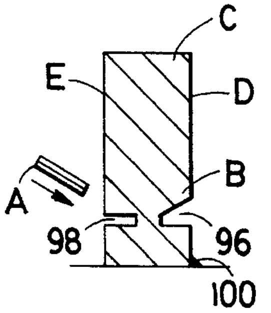
Figure 5H:
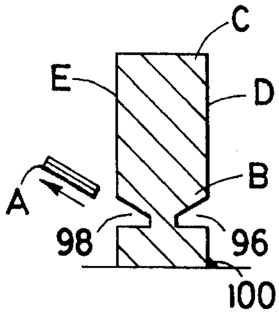
Figure 5I:
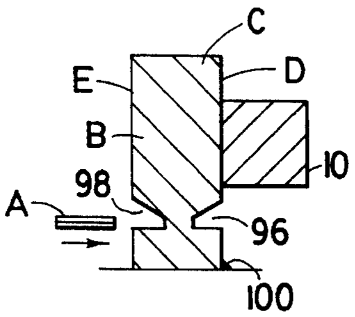
Figure 5J:
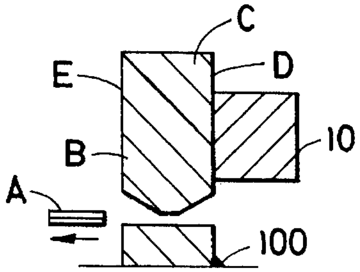

Referring to FIG. 3, a top view of the ring support member 10 engaging a ring-shaped structure C is shown and referring to FIG. 4 a cross-sectional view taken along the line 4—4 of FIG. 3 illustrating more clearly the various engagements when a ring support member 10 is installed. The assembly of the ring support member 10 has already been described above and will not be repeated here again, except for the connections to the plate 20. In this embodiment, a pair of chuck jaws G, located on opposite sides of the plate 20, secure the plate 20. The chuck jaws G are on a chuck H and are able to rotate in a circular direction by a motor (not shown). Although two chuck jaws G are shown, any number of chuck jaws G or any other type of device to secure the plate 20 could be used. When the ring support member 10 is installed, the stepped portions 70 and 82 of each base 40 each second clamping device 18, respectively, are seated within and on opposite sides of one of the radially disposed slots 76 in the plate 20. Each bar assembly 12 is adjusted along the length of one radially disposed slot 76 to engage the convex arcuate surface 28 with the inner circumference D of the ring-shaped structure C, as shown more clearly in FIG. 3. The blocks 45 on each convex arcuate surface 28 engage with the inner circumference D to support the ring piece B. As shown in FIG. 4, the stops 44 and blocks 45 are disposed above the location of the cut being made through the ring-shaped structure C, although the stops 44 and blocks 45 could be disposed above and below the cut, if desired. The cutting tool A is connected to a machine ram F which drives the cutting tool A.

The operation of the ring support member 10 is illustrated with reference to FIGS. 3 and 4 to illustrate the orientation of the ring support member 10 during a cut and with reference to FIGS. 5(*a–j*) to illustrate the steps. The inner circumference D of the ring-shaped structure C shown in FIGS. 5 (*a–j*) is to the right of the cross-sectional portion of the ring-shaped structure C shown. To cut a ring piece B, the plate 20 which is first secured by a pair of chuck jaws G. Next, the ring-shaped structure C is secured to the plate 20 with one or more tack welds 100 along the inner circumference D, as shown in FIGS. 4 and 5(*a*). Once the ring-shaped structure C is tack welded to the plate 20, then the cutting tool A connected to the machine ram F is moved from its position on the outer circumference E shown in FIG. 4 into the center of the ring-shaped structure C as shown in FIG. 5(*a*). Suitable forms of cutting tools A include a lathe cut off tool or a part-off tool. A first cut 96 is made horizontally along the inner circumference D of the ring-shaped structure C by the cutting tool A, as shown in FIG. 5(*b*). As illustrated, this first cut 96 does not pass through the ring-shaped structure C. The first cut 96 is made by rotating the chuck jaws G and chuck H, thus rotating the plate 20, while the cutting tool A remains in a stationary position. When the first cut 96 is completed, the cutting tool A is removed from the first cut 96. Next, the machine ram F is raised and the cutting tool A is angled downward to chamfer the first cut 96, as shown in FIGS. 5(*c*) and 5(*d*). In this example, the first cut 96 is chamfered at an angle of about 45 degrees.

Once the first cut 96 has been chamfered, the machine ram F and cutting tool A are moved back out to the outer circumference E of the ring-shaped structure C as shown in FIGS. 4, 5(*e–j*). Since only one cross-sectional portion of the ring-shaped structure C is shown in FIGS. 5(*a–j*), the cutting tool A in FIGS. 5(*e–j*) is shown approaching the outer circumference E of the ring-shaped structure C from the opposite side from the position shown in FIG. 4. It would be appreciated by one skilled in the art that the cut could be made anywhere along the outer circumference E provided the cut aligns with the first cut 96.

When the cutting tool A is in position to make a cut along the outer circumference E, as shown in FIG. 4 or FIG. 5(*e*), a second cut 98 is made. The second cut 98 is disposed substantially opposite to and aligned with the first cut 96, but does not pass through to the first cut 96. Once the second cut 98 has been made, the cutting tool A is withdrawn from the second cut 98 as shown in FIG. 5(*f*). The machine ram F is then again raised and the cutting tool A is then angled downward to chamfer the second cut 98, as shown in FIGS. 5(*g*) and 5(*h*). In this example, the second cut 98 is chamfered at an angle of about 45 degrees. Once the second cut 98 has been chamfered, the ring support assembly 10 is installed on plate 20 and against the ring piece B of the ring-shaped structure C.

First the parts of the ring support assembly 10 itself need to be assembled. Each supporting stud 14 is passed through the center hole 42 in one bar assembly 12, through the threaded opening 56 in one hand knob 54, through one hex jam nut 58 and into the threaded hole 62 in one T-handle 60. The T-handle 60 is screwed down on to the threaded end 50 of the supporting stud 14. The other end 52 of the supporting stud 14 passes through an opening 64 in one base 40. Bolts 38 are passed through the four holes 36 in each bar assembly 12 and into holes 66 in the base 40 to secure face 34 of the bar assembly 14 to side 68 of the base 40. Next, the stepped portion 70 of each base is seated in one of the radially disposed slots 76 on one side of the plate 20. The other end 52 of the supporting stud 14, which passes through each base 40 and the radially disposed slot 76, engages with the threaded hole 80 in clamping assembly 18. The second clamping assembly 18 has a stepped portion 82 which fits in the same radially disposed slot 76 on the other side of the plate 20. Before the second clamping assembly 18 is tightly secured in the radial slot 76, the supporting stud 14 is moved along the radial slot 76 to dispose the stops 44 and blocks 45 against the inner circumference D of the ring-shaped structure C, as shown in FIGS. 3, 5(*i*), and 5(*j*). If the blocks 45 are not used, then the stops 44 would be positioned against the inner circumference D. After the bar assembly 12 with the stops 44 and blocks 45 is in position, then the T-handle 60 is turned a ¼ turn to turn stepped portion 82 sideways in radial slot. 76. The width of stepped portion 82 is narrower than slot 76 when first inserted, but is wider than slot 76 when turned a ¼ turn by T-handle 60, thus securing the clamping assembly 18 to the plate 20 and the stops 44 and blocks 45 against the inner circumference D.

Once the ring support assembly 10 is installed as shown FIG. 5(*i*), then the cutting tool A is moved into to cut from the first cut 96 to the second cut 98 to complete the ring piece B. Once this cut is complete, then the ring support assembly 10 is removed and the ring piece B is finished.

When the ring support assembly 10 is used, the weight of the ring piece B does not bear down on the cutting tool A. As a result, the blade does not bind within the cut. By preventing the blade from binding, ring pieces B can be cut more quickly increasing productivity. Additionally, the resulting ring pieces B have a higher and more uniform quality because the direction of the cut is not altered. Additionally, by supporting the ring piece B, the ring piece B does not break off leaving a burr nor does it fly off from the plate 20 and strike someone.

Having thus considered the basic concept of the invention, it will be readily apparent to those skilled in the art that the foregoing detailed disclosure is intended to be presented by way of example only and is not limiting. Various alterations, improvements, and modifications will occur to those skilled in the art, though not expressly stated herein. These modifications, alterations and improvements are intended to be covered hereby, and are within the spirit and scope of the invention.

What is claimed is:

1. A ring support member for holding a ring piece being cut from a ring-shaped structure, the ring support member comprising:

a bar assembly having a convex arcuate surface adapted to be disposed against and aligned with an inner circumferential portion of the ring-shaped structure, said bar assembly further including a pair of substantially parallel faces substantially perpendicular to the convex arcuate surface;

a supporting stud extending substantially perpendicularly through the faces of said bar assembly; and a first clamping assembly and a second clamping assembly, said first clamping assembly attached to one end of said supporting stud and adapted to fix said bar assembly to said supporting stud and said second clamping assembly adapted to slidably fix another end of said supporting stud to a plate having first and second parallel sides and at least one elongated radial passage extending between the first and second sides, wherein a base connected between one of the faces of said bar assembly and said second clamping assembly at the other end of said supporting stud is adapted to slidably fit within said elongated passage from the first side of said plate and said second clamping assembly is adapted to slidably fit within said elongated passage from the second side of said plate.

2. The support member according to claim 1 wherein said base has a first stepped portion adapted both to slidably fit within and be retained by said elongated passage from the first side of said plate and said second clamping assembly has a second stepped portion adapted both to fit within and be retained by said elongated passage from the second side of said plate.

3. The support member according to claim 2 wherein:

said ends of said supporting stud are threaded;

said first clamping assembly comprises a threaded fastener on one end of said supporting stud; and said second clamping assembly comprises a clamping device with a third hole which is threaded and adapted to engage with the other end of said supporting stud.

4. The support member according to claim 1 further comprising a pad on the convex arcuate surface.

5. The support member according to claim 4 wherein said pad comprises at least two stops distal from one another along the convex arcuate surface.

6. The support member according to claim 5 wherein said stops are nylon stops.

7. A support assembly for supporting a piece being cut from a ring-shaped structure, the support assembly comprising:

two or more bar members, each said bar member having a surface adapted to be disposed against and aligned with an inner circumferential portion of the ring-shaped structure, each said bar member further including a pair of substantially parallel faces substantially perpendicular to the surface;

a supporting stud for each of said bar members, each said supporting stud extending substantially perpendicularly through the faces of one of said bar members;

a first clamping device for each of said supporting studs, each of said first clamping devices attached to one end of one of said supporting stud and adapted to fix one of said bar members to one of said supporting studs;

a base for each said bar member, each said base having a center hole for receiving one of said supporting studs and engaging one face of one of said bar members so that said bar member and said supporting stud are supported in a substantially upright direction;

a plate with at least two elongated radially disposed slots, said other end of each of said supporting studs passing through one of the radially disposed slots; and a second clamping device for each of said supporting studs, each of said second clamping devices attached to the other end of one of said supporting studs on the opposite side of said plate from said base, said second clamping device and said base adapted to slidably secure said other end of one of said supporting studs within one of said radially disposed slots in said plate.

8. The support assembly according to claim 7 wherein said base has a first stepped portion adapted both to slidably fit within be retained by one of said elongated passages from the first side of said plate and said second clamping assembly has a second stepped portion both adapted to fit within and be retained by said elongated passage from the second side of said plate.

9. The support assembly according to claim 8 wherein:

said ends of said supporting stud are threaded;

said first clamping assembly comprises a threaded fastener on one end of said supporting stud; and said second clamping assembly comprises a clamping device with a third hole which is threaded and adapted to engage with the other end of said supporting stud.

10. The support assembly according to claim 7 wherein said surface is a convex arcuate surface.

11. The support assembly according to claim 10 further comprising a pad on the convex arcuate surface.

12. The support assembly according to claim 11 wherein said pad comprises at least two stops distal from one another along the convex arcuate surface.

13. The support assembly according to claim 12 wherein said stops are nylon stops.

* * * * *